(12) United States Patent
Di Marco et al.

(10) Patent No.: US 12,213,050 B2
(45) Date of Patent: Jan. 28, 2025

(54) METHODS FOR MULTI-LANE DISCOVERY WITH PARTIALLY DISJOINT PATHS

(71) Applicant: Telefonaktiebolaget LM Ericsson (publ), Stockholm (SE)

(72) Inventors: Piergiuseppe Di Marco, Teramo (IT); Pontus Arvidson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 715 days.

(21) Appl. No.: 17/294,970

(22) PCT Filed: Jan. 11, 2019

(86) PCT No.: PCT/EP2019/050692
§ 371 (c)(1),
(2) Date: May 18, 2021

(87) PCT Pub. No.: WO2020/108799
PCT Pub. Date: Jun. 4, 2020

(65) Prior Publication Data
US 2022/0015006 A1    Jan. 13, 2022

Related U.S. Application Data

(60) Provisional application No. 62/771,651, filed on Nov. 27, 2018.

(51) Int. Cl.
*H04W 40/24* (2009.01)
*H04W 4/80* (2018.01)
*H04W 40/30* (2009.01)

(52) U.S. Cl.
CPC ........... *H04W 40/246* (2013.01); *H04W 4/80* (2018.02); *H04W 40/248* (2013.01); *H04W 40/30* (2013.01)

(58) Field of Classification Search
CPC ... H04W 40/28; H04W 84/18; H04W 40/246; H04W 40/248; H04W 40/02;
(Continued)

(56) References Cited

U.S. PATENT DOCUMENTS

| 6,275,470 B1 | 8/2001 | Ricciulli |
| 6,370,119 B1 | 4/2002 | Basso et al. |

(Continued)

FOREIGN PATENT DOCUMENTS

| CA | 2358174 A1 | 4/2003 |
| CN | 101088259 A | 12/2007 |

(Continued)

OTHER PUBLICATIONS

Machine Translation of JP-2009273140-A (Year: 2009).*
(Continued)

*Primary Examiner* — Allahyar Kasraian
(74) *Attorney, Agent, or Firm* — Murphy, Bilak & Homiller, PLLC

(57) ABSTRACT

A method for multilane path discovery between a first node and a second node in a wireless mesh network, the method being performed by an intermediate node and comprising: receiving, by the intermediate node, a path request for establishing a path between the first and second nodes, wherein the path request comprises node count information related to the path between the first and second nodes; determining, by the intermediate node, that the received node count information is less than or equal to node count information, corresponding to a path between the first and second nodes, that is stored in a discovery table of the intermediate node; and updating, by the intermediate node, the stored node count information with the received node count information.

14 Claims, 10 Drawing Sheets

(58) Field of Classification Search
CPC ..... H04W 40/30; H04W 40/04; H04W 40/24; H04W 40/34; H04L 45/123; H04L 45/00; H04L 45/20; H04L 45/02; H04L 45/12; H04L 45/1283; H04L 45/26
See application file for complete search history.

(56) References Cited

U.S. PATENT DOCUMENTS

| | | | |
|---|---|---|---|
| 7,133,929 B1* | 11/2006 | Shah | H04L 49/1515 710/316 |
| 8,861,398 B2 | 10/2014 | Bhatti et al. | |
| 10,588,069 B1* | 3/2020 | Chen | H04L 45/26 |
| 2003/0101279 A1* | 5/2003 | Maheshwari | H04L 45/00 709/241 |
| 2005/0271006 A1 | 12/2005 | Chari et al. | |
| 2006/0002368 A1 | 1/2006 | Budampati et al. | |
| 2006/0092898 A1* | 5/2006 | Kim | H04L 45/20 370/331 |
| 2007/0070909 A1* | 3/2007 | Reeve | H04L 45/00 370/238 |
| 2009/0175238 A1 | 7/2009 | Jetcheva et al. | |
| 2009/0201844 A1* | 8/2009 | Bhatti | H04W 4/06 370/312 |
| 2009/0228575 A1 | 9/2009 | Thubert et al. | |
| 2009/0238109 A1* | 9/2009 | Byard | H04L 45/26 370/328 |
| 2010/0246480 A1* | 9/2010 | Aggarwal | H04W 40/02 370/328 |
| 2011/0268013 A1* | 11/2011 | Levendel | H04W 40/248 370/315 |
| 2013/0202299 A1* | 8/2013 | Prakash | H04J 14/0271 398/51 |
| 2014/0068105 A1 | 3/2014 | Thubert et al. | |
| 2015/0236947 A1* | 8/2015 | Kobayashi | H04W 40/10 370/254 |
| 2018/0139683 A1* | 5/2018 | Kwon | H04W 40/22 |

FOREIGN PATENT DOCUMENTS

| | | | |
|---|---|---|---|
| CN | 101232458 A | 7/2008 | |
| CN | 101517932 A | 8/2009 | |
| CN | 101945432 A | 1/2011 | |
| CN | 101969682 A | 2/2011 | |
| CN | 102264114 A | 11/2011 | |
| CN | 102281200 A | 12/2011 | |
| CN | 102427596 A | 4/2012 | |
| CN | 103237330 A | 8/2013 | |
| CN | 106028415 A | 10/2016 | |
| CN | 106686659 A | 5/2017 | |
| CN | 107241778 A | 10/2017 | |
| CN | 113810976 A | 12/2021 | |
| EP | 2993842 A1 | 3/2016 | |
| GB | 2440461 A | 1/2008 | |
| JP | 2009273140 A | * 11/2009 | H04L 12/28 |
| WO | 2013100752 A1 | 7/2013 | |
| WO | 2017063866 A1 | 4/2017 | |
| WO | 2017121660 A1 | 7/2017 | |
| WO | 2020035159 A1 | 2/2020 | |

OTHER PUBLICATIONS

Zhang, Changzhong, et al., "A Breadth-First and Disjoint Multi-Path Routing Algorithm in Wireless Mesh Networks", 15th IEEE Conference on Communication Technology, Nov. 11, 2013, pp. 560-564.

Heydon, Robin, et al., "Mesh Model", Bluetooth Specification; v1.0; Mesh Working Group, Jul. 13, 2017, pp. 1-314.

Perkins, C., et al., "Ad hoc On-Demand Distance Vector (AODV) Routing", Network Working Group; Request for Comments: 3561; Category: Experimental, Jul. 2003, pp. 1-37.

"Mesh Profile", Bluetooth Specification, Revision V. 1.0., Mesh Working Group, Jul. 13, 2017, pp. 1-331.

* cited by examiner

METHODS FOR MULTI-LANE DISCOVERY WITH PARTIALLY DISJOINT PATHS

Technical Field

The present invention generally relates to wireless communication networks, and more specifically relates to improvements to forwarding of data messages in mesh networks, such as Bluetooth mesh networks.

BACKGROUND

Bluetooth™ refers generally to a standardized group of technologies usable to exchange data between devices over short distances using radio transmission and reception in the 2.4-GHz Industrial, Scientific and Medical, ISM, band. The promulgation and management of Bluetooth standards is done by various committees of the Bluetooth SIG, of which over 30,000 companies are members.

Bluetooth Low Energy, LE, is a particular version of Bluetooth technology that was first standardized by the Bluetooth Special Interest Group, SIG, in 2010. Bluetooth LE is generally targeted at low-power applications that can tolerate lower-rate communications than, e.g., more traditional Bluetooth applications. Furthermore, Bluetooth LE is suitable for inexpensive devices that are constrained in terms of memory and computational resources.

Even so, Bluetooth LE leverages a robust frequency-hopping spread spectrum approach that transmits data over 40 channels. Furthermore, a Bluetooth LE-compliant radio includes multiple physical layer (PHY) options that support data rates from 125 kb/s to 2 Mb/s, multiple power levels, from 1 mW to 100 mW, as well as multiple security options.

Bluetooth LE also supports multiple network topologies, including a conventional point-to-point topology used for establishing one-to-one (1:1) communications between two devices. In addition, Bluetooth LE supports a broadcast (one-to-many, or 1:m) device communications. The broadcast topology can be used for localized information sharing and for location services such as retail point-of-interest information, indoor navigation and wayfinding, and item/asset tracking.

Finally, Bluetooth LE supports a mesh topology that can be used for establishing many-to-many (m:m) device communications. The mesh topology based on Bluetooth LE can enable the creation of large-scale device networks such as for control, monitoring, and automation systems where tens, hundreds, or thousands of devices need to reliably and securely communicate with each other. In the Bluetooth LE mesh topology, each device in a mesh network potentially can communicate with every other device in the mesh network. Communication is achieved using messages, and devices can relay messages to other devices so that the end-to-end communication range is extended far beyond the radio range of each individual device.

Devices that are part of a Bluetooth LE mesh network are often referred to as "nodes" whereas other devices not part of the mesh (e.g., even though within range of the mesh) are often referred to as "unprovisioned devices." The process of transforming an unprovisioned device into a node is often referred to as "provisioning," while the device responsible for adding a node to a network and configuring its behaviour is often referred to as a "provisioner." Provisioning is a secure procedure which results in an unprovisioned device possessing a series of encryption keys and being known to the provisioner, such as a tablet or smartphone.

As mentioned above, communication in a Bluetooth mesh network is "message-oriented" and various message types are defined. For example, when a node needs to query the status of other nodes or needs to control other nodes in some way, it can send a message of a suitable type. If a node needs to report its status to other nodes, it can send a message of suitable type. Messages must be sent from an address to another address. Bluetooth mesh topology supports three different types of addresses. A unicast address uniquely identifies a single element (e.g., devices can include one or more elements), and unicast addresses are assigned to devices during the provisioning process. A group address is a multicast address which represents one or more elements. A virtual address may be assigned to one or more elements, spanning one or more nodes.

To further facilitate the use of Bluetooth LE in mesh topologies, the Bluetooth SIG promulgated the Mesh Profile Specification in July 2017. FIG. 1 shows an exemplary layered mesh architecture based on Bluetooth LE, as specified by the Bluetooth SIG. At the top is the Model layer, which defines models used to standardize the operation of typical user scenarios, such as models for lighting and sensors. The Model layer is further defined in other Bluetooth specifications, including a Bluetooth Mesh Model specification. The Foundation Model layer defines the states, messages, and models required to configure and manage a mesh network. The Access layer defines how higher-layer applications can use the upper transport layer. It defines the format of the application data; it defines and controls the application data encryption and decryption performed in the upper transport layer; and it checks whether the incoming application data has been received in the context of the right network and application keys before forwarding it to the higher layer.

The Transport layer is subdivided into the Upper and Lower Transport Layers. The Upper Transport Layer encrypts, decrypts, and authenticates application data and is designed to provide confidentiality of access messages. It also defines how transport control messages are used to manage the upper transport layer between nodes, including when used by the "Friend" feature. The Lower Transport Layer defines how upper transport layer messages are segmented and reassembled into multiple Lower Transport Protocol Data Units (PDUs) to deliver large upper transport layer messages to other nodes. It also defines a single control message to manage segmentation and reassembly.

The Network Layer defines how transport messages are addressed towards one or more elements. It defines the network message format that allows Transport PDUs to be transported by the bearer layer. The network layer decides whether to relay/forward messages, accept them for further processing, or reject them. It also defines how a network message is encrypted and authenticated. The bearer layer defines how network messages are transported between nodes. There are two bearers defined, the advertising bearer and the GATT bearer.

At the bottom of the exemplary architecture shown in FIG. 1 are the Bluetooth LE radio layers. FIG. 2 illustrates an exemplary integration of Bluetooth mesh networking with the Bluetooth LE architecture shown in FIG. 1. In FIG. 2, shading is used to indicate blocks or layers that are part of the Bluetooth LE specification. At the bottom are the Bluetooth LE physical (PHY) and link layers, which typically can be implemented in the Bluetooth controller. The layers above link layer typically can be implemented on the Bluetooth host device. On the left side of FIG. 2 are Bluetooth LE higher layers that can be utilized independent of mesh networking functionality. The non-shaded blocks on the right side above the link layer correspond to the mesh networking architecture shown in FIG. 1 (plus provisioning). In this manner, applications (shown at the top-most layer in FIG. 2) can utilize both mesh and non-mesh functionality of the underlying Bluetooth LE technology.

Currently, Bluetooth mesh networking is based on "flooding" which uses broadcasting over a set of shared channels—the advertising channels. A node acting as a relay node in a Bluetooth mesh network scans for mesh messages. When a message is detected and received the node checks if it is the destination of the message. The message can be forwarded in the mesh network by re-transmitting it so that the neighbours of the node can receive it. By means of this distributed mechanism the message is forwarded from node to node(s) in the network so that the message arrives at the destination.

Flooding, as specified in version 1.0 of the Bluetooth mesh specification, has some drawbacks including increased interference and energy consumption, especially as the level of traffic in the network increases. As such, subsequent versions of the Bluetooth mesh specifications are expected to implement mechanisms to limit packet forwarding to occur only along specific paths towards the intended receiver(s). This is expected to reduce the amount of traffic (and consequently alleviate the exemplary drawbacks mentioned) in directions where forwarding does not help improving the probability of successful delivery.

FIG. 3 illustrates message flooding in an exemplary mesh network (e.g., a Bluetooth mesh network) comprising a source node (S), a destination node (D), and a number of relay nodes. As can be seen in FIG. 3, there are multiple copies of the message reaching the destination (D), thereby increasing the chance of successful reception by D via this redundancy.

One known technique to construct forwarding paths between a source and one or more destinations is through path discovery according to an "Ad hoc On-demand Distance Vector (AODV)," such as specified in Request For Comments, RFC, 3561 published by Internet Engineering Task Force (IETF). AODV can determine unicast routes to destinations within an ad hoc network with quick adaptation to dynamic link conditions, while requiring relatively low processing and memory overhead and low network utilization. In addition, AODV uses destination sequence numbers to facilitate freedom from loops, even after anomalous delivery of routing control messages.

More specifically, AODV methods establish paths by means of Path Request (also referred to as "Route Request") messages flooded by the originator and Path Reply (also referred to as "Route Reply") messages unicasted back by the destination. Intermediate relays that receive the Path Reply message store path information in a forwarding table and are entitled to forward packets. Sequence numbers (also referred to as "forwarding numbers") increase with each new Path Request message and, as such, can be used to distinguish new Path Request messages from copies of Path Request messages already forwarded in the network.

FIG. 4 illustrates an exemplary format of a Route Request (RREQ) message used in the AODV routing protocol specified in RFC 3561. In the format shown in FIG. 4, the source node generates the new sequence number and inserts it into the "Originator Sequence Number" field of the path request message, filling other message fields as needed with relevant values. Note that the top-most 32-bit word shown in FIG. 3 includes a hop count field and a reserved field. Similarly, FIG. 5 illustrates an exemplary format of a Route Reply (RREP) message used in the AODV routing protocol specified in RFC 3561. In the format shown in FIG. 5, the "destination sequence number" can correspond to the sequence number of the path request message. Note that the top-most 32-bit word in the format shown in FIG. 5 also includes a hop count field and a reserved field.

Ultimately, AODV selects a single path between source and destination nodes, such as illustrated in the exemplary mesh network shown in FIG. 6. However, due to the intrinsically lossy medium-access techniques used in Bluetooth mesh and the low duty cycle of the underlying Bluetooth LE radios (used to reduce energy consumption), a single path may be insufficient to maintain a guaranteed successful reception rate. In other words, multiple paths may be needed between source and destination, with the various paths being at least partially disjoint and/or independent. There are various problems, issues, and/or drawbacks related to establishing multiple paths according to these requirements.

SUMMARY

Embodiments of the present disclosure provide specific improvements to communication between nodes in a wireless mesh network, such as by providing novel techniques for establishing multiple (or redundant) independent paths between a source node and a destination node via a plurality of intermediate nodes in the mesh network. In this manner, embodiments can increase redundancy and/or reliability (e.g., compared to the existing single-path AODV discovery) when used in mesh networks (e.g., Bluetooth mesh networks), such that the likelihood of successful message delivery towards a destination improves in a wider range of deployment scenarios.

Some exemplary embodiments of the present disclosure include methods and/or procedures for multilane path discovery between a first node and a second node in a wireless mesh network. The exemplary method and/or procedure can be performed by an intermediate node (e.g., user equipment, wireless device, IoT device, Bluetooth Low-Energy device, etc. or component thereof) in the wireless mesh network (e.g., a Bluetooth mesh network).

The exemplary methods and/or procedures can include receiving a path request for establishing a path between the first and second nodes, wherein the path request comprises node count information related to the path between the first and second nodes. For example, the path request can be an Ad hoc On-Demand Distance Vector (AODV) Route Request (RREQ) message. The exemplary methods and/or procedures can also include determining if the received node count information is less than or equal to node count information, corresponding to a path between the first and second nodes, that is stored in a discovery table of the intermediate node The exemplary methods and/or procedures can also include performing further operations if it is determined that the received node count information is less than or equal to the stored node count information. In various embodiments, the further operations can include updating the stored node count information with the received node count information, determining if a forwarding table of the intermediate node includes an entry corresponding to a path between the first and second nodes, and/or modifying the node count information in the path request based on whether the forwarding table includes the entry.

Other exemplary embodiments of the present disclosure include other methods and/or multilane path discovery between a first node and a second node in a wireless mesh network. The exemplary method and/or procedure can be performed by an intermediate node (e.g., user equipment, wireless device, IoT device, Bluetooth Low-Energy device, etc. or component thereof) in the wireless mesh network (e.g., a Bluetooth mesh network).

These exemplary methods and/or procedures can include receiving a lane request for establishing a lane for a path between the first and second nodes, wherein the lane request comprises a source address associated with the first node and a destination address associated with the second node. The exemplary methods and/or procedures can also include, based on the source and destination addresses, determining whether a forwarding table, stored by the intermediate node, includes an entry corresponding to a path between the first and second nodes via the intermediate node. The exemplary methods and/procedures can also include, if it is determined that the forwarding table includes the entry, incrementing a value, comprising the entry, that indicates a number of lanes between the first and second nodes via the intermediate node.

In some embodiments, the exemplary methods and/procedures can also include, if it is determined that the forwarding table does not include the entry, adding an entry to the forwarding table, wherein the added entry comprises the source address, the destination address, and a value indicating that the number of lanes between the first and second nodes via the intermediate node is equal to one. In some embodiments, the exemplary methods and/procedures can also include forwarding the lane request to one or more further nodes in the wireless mesh network. In some embodiments, the lane request can comprise an Ad hoc On-Demand Distance Vector (AODV) Route Request (RREQ) message.

Other exemplary embodiments include wireless mesh network nodes (e.g., user equipment, wireless device, IoT device, Bluetooth Low-Energy device, etc. or component thereof) configured to perform operations corresponding to various ones of the exemplary methods and/or procedures described above. Other exemplary embodiments include non-transitory, computer-readable media storing program instructions that, when executed by at least one processor, configure such nodes to perform operations corresponding to the exemplary methods and/or procedures described above.

These and other objects, features and advantages of the exemplary embodiments of the present disclosure will become apparent upon reading the following detailed description of the exemplary embodiments of the present disclosure.

DETAILED DESCRIPTION

Figure 1:
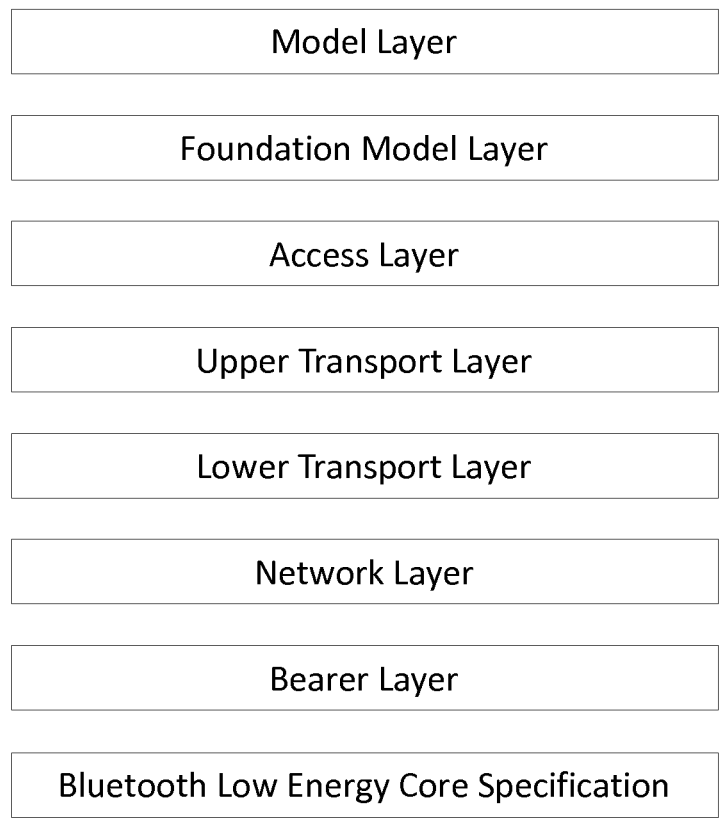
FIG. 1 shows an exemplary layered mesh architecture based on Bluetooth LE, as specified by the Bluetooth SIG.

As briefly mentioned above, existing techniques (e.g., AODV) that select a single path between source and destination nodes create various problems when used in Bluetooth mesh networking. For example, due to the intrinsically lossy medium access techniques used in Bluetooth mesh and the low duty cycle of the underlying Bluetooth LE radios (used to reduce energy consumption), the selection of a single path may be insufficient to maintain a guaranteed successful reception rate. For example, it can be useful to have redundancy in the number of paths available between a source-destination pair. However, existing mechanisms to establish multiple, redundant paths have various drawbacks when applied in certain situations encountered in Bluetooth mesh networks.

As mentioned above, AODV uses RREQ and RREP messages to establish a path through the wireless mesh network for forwarding messages from a source node to a destination node. Initially, a path originator node (PO, also referred to herein as a "source node") needing to establish a first path to a destination node sends a RREQ with a newly generated forwarding or sequence number. This can occur, for example, if the destination node is previously unknown to the source node. RREQ is a single-hop broadcast message sent to neighbour nodes. Any relay and/or intermediate node that receives this message will generate a new RREQ using its own device address as a new RREQ network source address. The RREQ message propagation continues until the RREQ is received by the path destination node (PD), and each intermediate node that receives and forwards the RREQ also increments the hop count field in the message. Thus, when the RREQ reaches the PD node, the hop count represents the distance (in "hops") between PO and PD.

When the PD node receives the RREQ messages, it selects the "best" relay to establish the path. Router selection can be based on the hop count metric, together with either random path selection or average Received Signal Strength Indicator (RSSI). In the first case, the intermediate node that sends the RREQ with the minimum hop count is selected as the best one. If there are more than one intermediate node sending RREQ with the same hop count, the next-hop relay is randomly selected among these. In the second case, the intermediate node that sends the RREQ with minimum hop count and the highest average RSSI is selected as the next hop for forwarding the RREQ message.

The PD node then sends a unicast path response (RREP) message to the selected intermediate node. Once the selected intermediate node receives the RREP message, it repeats the same procedure and generate a new RREP message until it reaches the path originator node (PO). When intermediate nodes in the "best path" receive this path reply, they store the corresponding path information in their respective forwarding tables. Each path may be uniquely identified in a forwarding table by an entry that can include, e.g., the following information:

PO: network address of the path originator.
PD: network address of the path destination.
OFN: sequence number of the path request session. number.
NTO: network address of the node toward the path originator.
NTD: network address of the node toward the path destination.
Subscription list: groupcast address list that needs to be supported by the current path.

After the forwarding table is established in an intermediate node and the node receives an application (e.g., data) message, the node checks source (SRC) and destination (DST) fields of the message against the forwarding table (e.g., against the PO and PD fields, respectively). If a match is found, the intermediate node forwards the message to the next hop (e.g., as identified by the NTD field in the forwarding table entry) toward the path destination node PD.

One technique that has been used to establish multiple paths in an ad hoc network is the Equal-Cost Multi-Path (ECMP) algorithm. In ECMP, next-hop packet forwarding to a single destination can occur over multiple "best paths" which tie for top place in routing metric calculations. However, ECMP introduces complex operations at intermediate nodes.

ECMP also has another drawback that makes it unsuitable for Bluetooth mesh. A particular feature of Bluetooth Mesh is that data messages do not contain explicit next-hop indications. As mentioned above, a path is identified by a combination of the addresses of the originator of the path and the address of the destination of the path. As such, multiple nodes that receive a message and belong to the path can forward the message. Since ECMP requires explicit next-hop indication, it is not compatible for use with Bluetooth mesh networks.

Another possibility for establishing multiple paths for Bluetooth Mesh is to allow a destination to send multiple Path Reply messages for a single Path Request. However, it is not easy to construct independent paths since the information about already-established paths is not available at every node in the network. It is very likely that intermediate relay nodes that receive multiple Path Reply messages forward these messages to the same relay to minimize the cost from the originator. As such, any established multiple paths will very likely share the same intermediate links. If relay nodes don't select the relay with the minimum cost for forwarding, the risk is that the redundant path becomes extremely long in term of number of hops.

As mentioned above, a path is identified by a combination of the addresses of the path originator and path destination, such that multiple nodes that receive a message and belong to the path can forward it. Even so, network topology and propagation conditions in a wireless mesh network can pose limitations to the available redundancy mechanisms. One technique for adding redundant nodes to a main path is disclosed in U.S. Provisional Appl. No. 62/662,312, which is incorporated herein by reference and has a common Applicant with the present Application. This technique introduces assistant relay nodes for local path repair of a main path but is limited to cases where the assistant relay nodes are neighbours of nodes in the main path.

Figure 7:
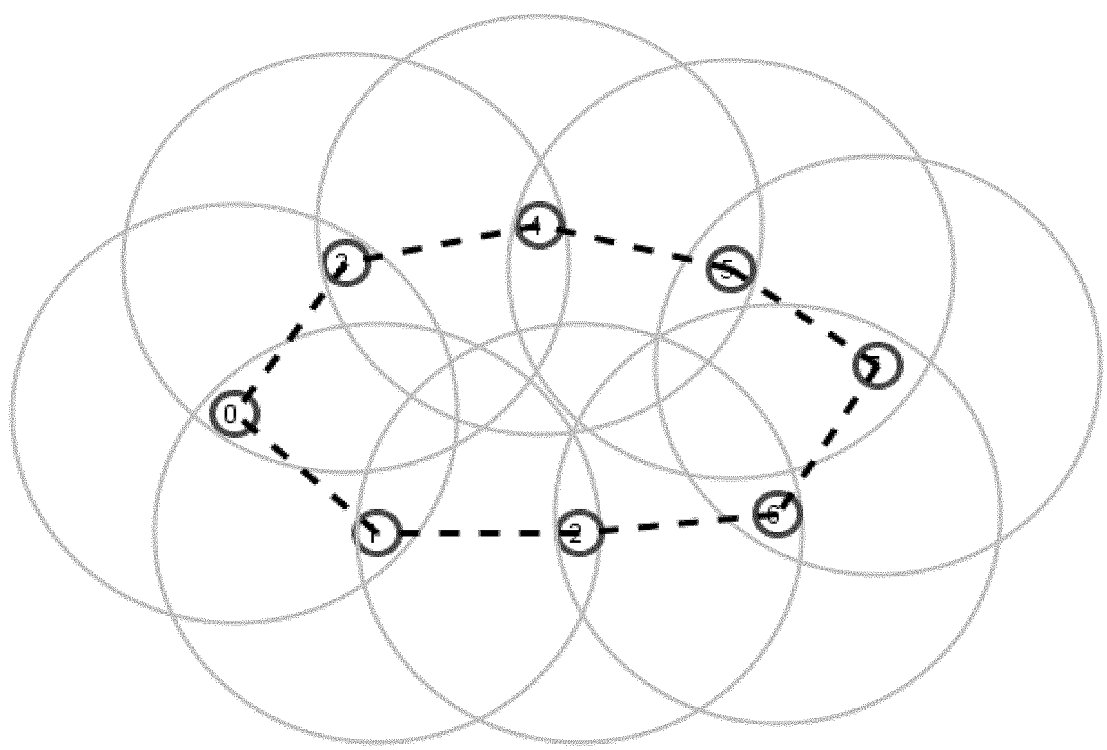
FIG. 7-8 illustrates two exemplary wireless mesh deployment scenarios.

In other words, this technique may not always provide the necessary and/or desirable redundancy where alternate paths are disjoint and/or intermediate nodes are unable to hear each other. FIG. 7 illustrates an exemplary wireless mesh deployment scenario involving nodes labelled 0-7. Each circle indicates the reception range for the particular node located at the circle center. In this scenario, there is initially a main path through nodes 0-3-4-5-7. However, intermediate nodes 2 and 4 cannot hear each other, as indicated by their respective circles not extending to cover the other node. In such case, adding node 4 as an "assistant relay node" for node 2 would not be feasible.

Figure 3:
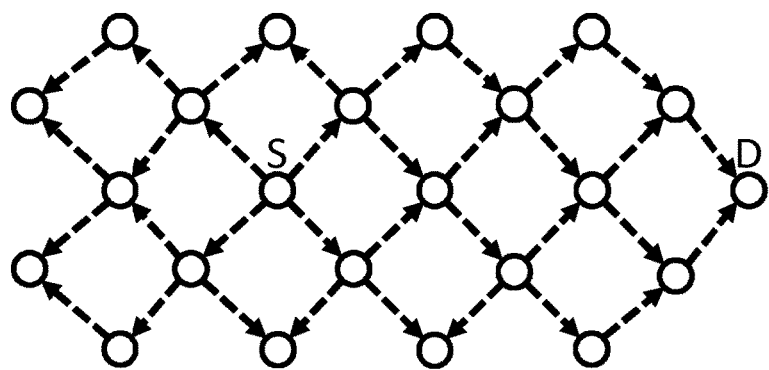
FIG. 3 illustrates message flooding in an exemplary mesh network comprising a source node (S), a destination node (D), and a number of relay nodes.
Figure 4:
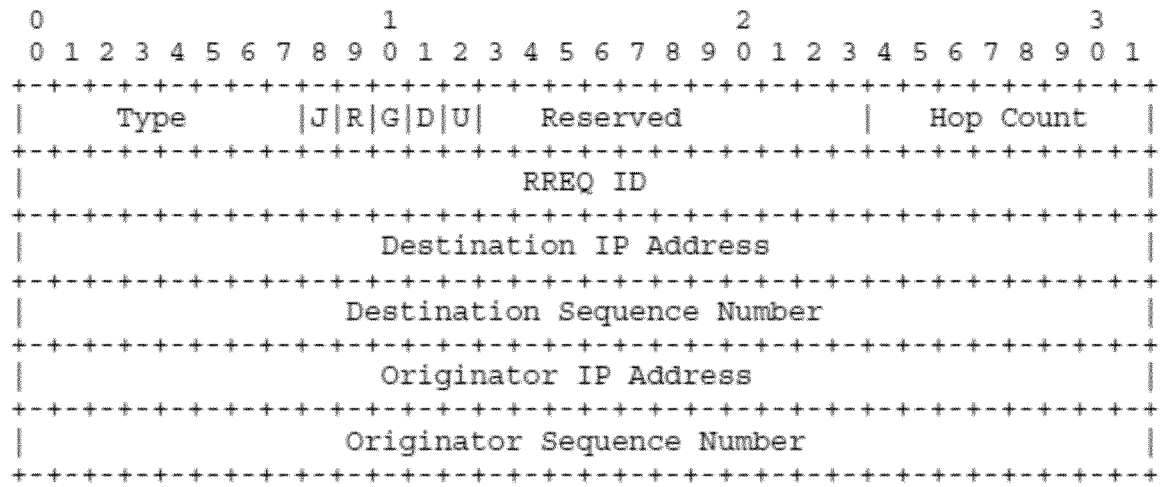
FIG. 4 illustrates an exemplary format of a Route Request (RREQ) message used in the AODV routing protocol specified in RFC 3561.
Figure 5:
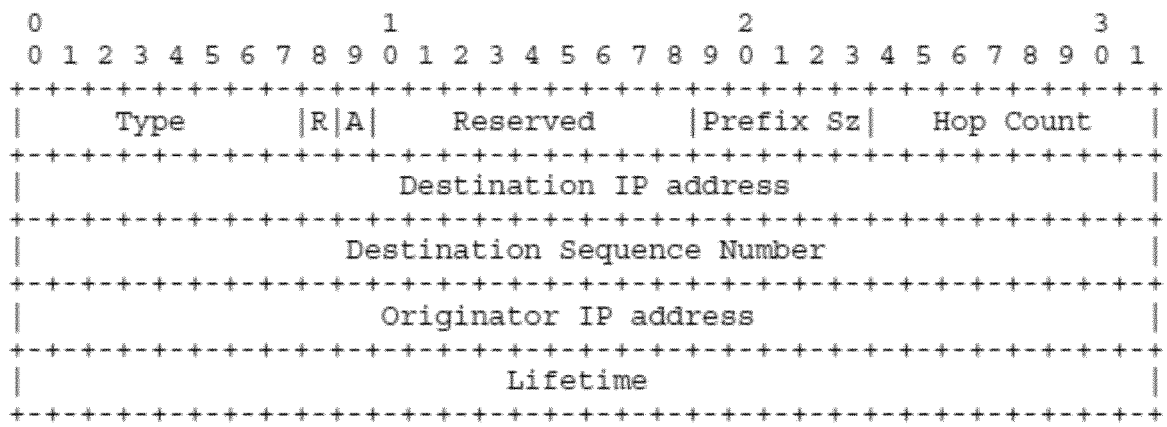
FIG. 5 illustrates an exemplary format of a Route Reply (RREP) message used in the AODV routing protocol specified in RFC 3561.
Figure 6:
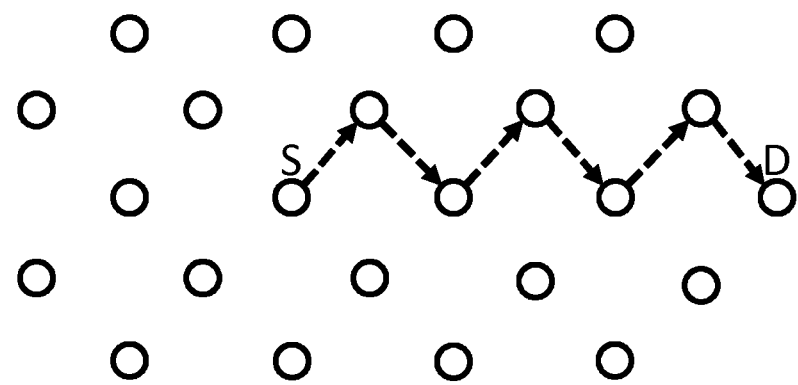
FIG. 6 illustrates a single source-destination path established in the exemplary mesh network shown in FIG. 3.

Another technique for adding completely independent redundant paths is disclosed in U.S. Provisional Appl. No. 62/719,247, which is incorporated herein by reference and also has a common Applicant with the present Application. This technique creates and/or establishes multiple independent paths between two nodes in a Bluetooth Mesh network, while reusing messages and operations already defined for the single path discovery. Built on top of the hop count metric (e.g., as described above in relation to FIGS. 3-4), this technique requires nodes that are already included in a path to forego participation in the subsequent lane discovery.

Figure 8:
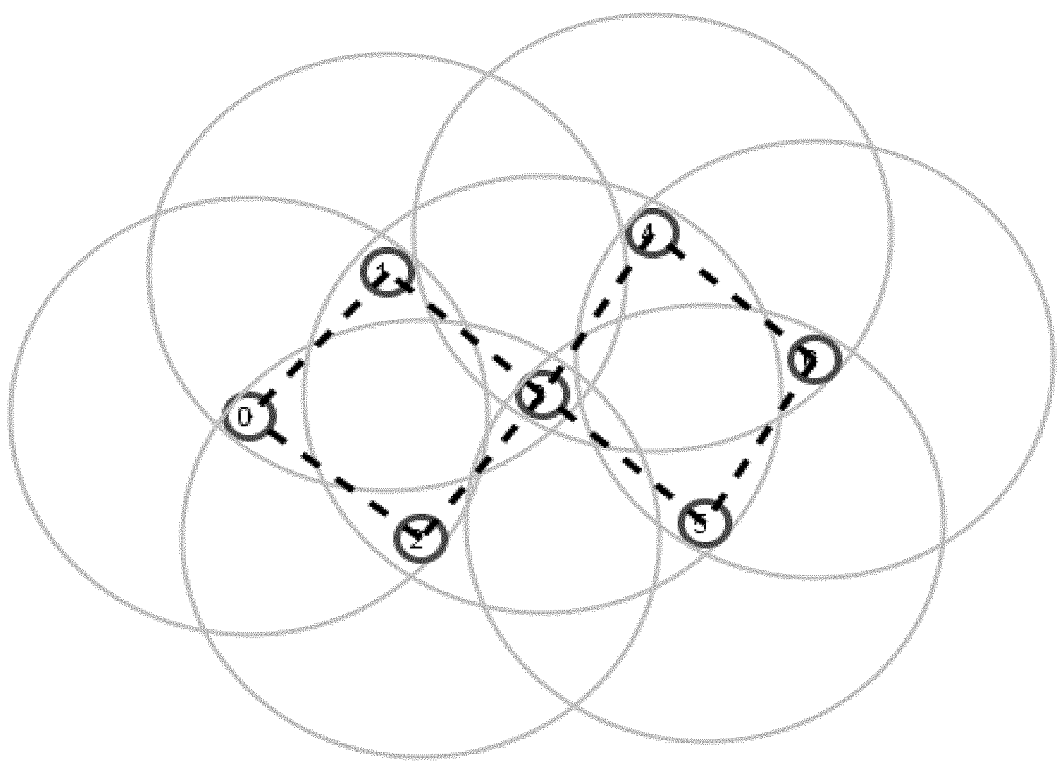

However, this technique may not always provide the necessary and/or desirable redundancy in network topologies where disjoint end-to-end paths are not available. FIG. 8 illustrates another exemplary wireless mesh deployment scenario involving nodes labelled 0-6, with circles indicating node reception range as in FIG. 7. In this scenario, nodes 1 and 4 cannot hear each other, and nodes 2 and 5 cannot hear each other. Accordingly, both paths between nodes 0 and 6 must traverse node 3, such that the two paths are not disjoint. For example, adverse conditions (e.g., failure, movement, poor radio conditions, high traffic, etc.) at node 3 can disable and/or inhibit both paths between nodes 0 and 6, which is very undesirable.

Accordingly, exemplary embodiments of the present disclosure provide novel techniques to create and/or establish multiple independent paths between two nodes in a Bluetooth Mesh network, based on a new path metric for multilane path discovery that incorporates both hop-count and the presence of the nodes in an existing lane. For example, these novel path metrics can combine hopcount and information on the number of overlapping nodes already present in the path, such that the number of hops involved in the message forwarding is balanced with a desired level of redundant nodes participating in message forwarding. For example, this new metric can be referred to as "node-count."

In this manner, by combining and/or balancing hop-count and required message-forwarding redundancy, such exemplary embodiments can provide an easily-implementable, multi-lane discovery technique that facilitates nodes to distinguish paths that are partially disjoint. Moreover, such techniques can be implemented in existing wireless mesh networks (e.g., Bluetooth mesh networks) without introducing additional overhead or complexity, such as new control messages or information that would need to be distributed through the mesh network (e.g., relative to a single-lane discovery mechanism, such as described above).

In various exemplary embodiments, exemplary path metrics can comprise the following two elements, fields, and/or variables:

hop-count, which is initialized to zero (0) by the originator of a discovery procedure, and incremented (e.g., by 1) at each node that receives (and potentially forwards) a discovery message sent by the originator.

number of overlaps, which is initialized to zero (0) by the originator of a discovery procedure, and incremented (e.g., by 1) at each node that receives (and potentially forwards) a discovery message sent by the originator, provided that the receiving/forwarding node's forwarding table already includes an entry associated with this particular discovery procedure.

The combination of these two elements, fields, and/or variables can be referred to as the "node count" path metric. In various embodiments, the combination can involve a non-weighted sum of the counts in the respective elements to form the node count metric. The two elements can also be combined via weighted sums, as well as by various other types of combining operations.

Furthermore, exemplary mesh nodes that utilize such path metrics can also include, in their respective forwarding tables, a field that indicates the number of lanes that are established through that particular node for a given source-destination path. For example, this field can be referred to as "number of lanes" (or NL for short). In contrast to multi-lane path discovery techniques disclosed in U.S. Provisional Appl. No. 62/719,247, a node that is already part of one of the lanes of a path is allowed to participate in the subsequent lane discovery operations for the same path.

Figure 9:
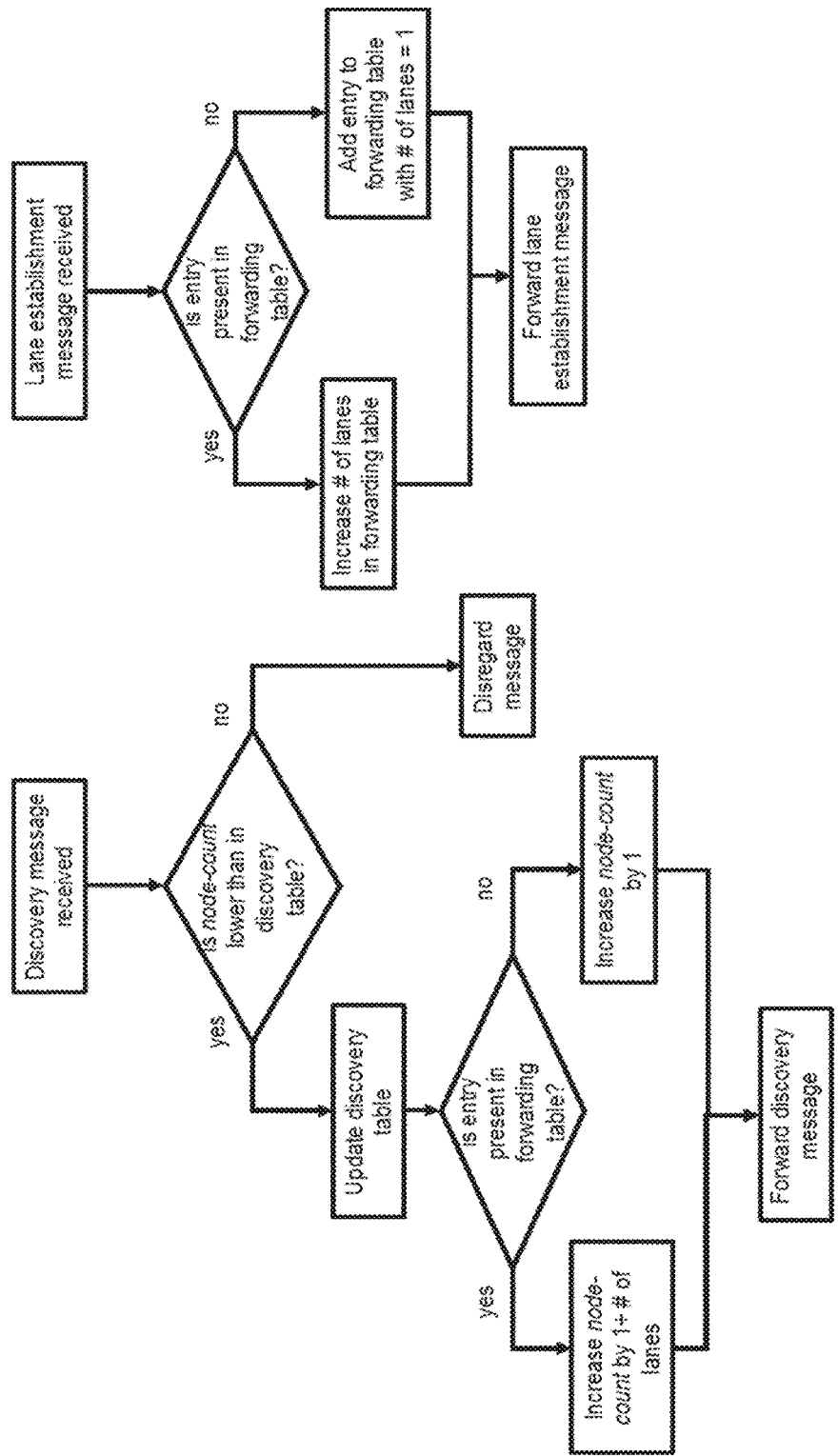
FIGS. 9-10 show flow diagrams of various exemplary methods and/or procedures for establishing multiple lanes (e.g., redundant paths) between a source node and a destination node in a wireless mesh network, according to various exemplary embodiments.

FIG. 9 shows a flow diagram of exemplary methods and/or procedures for establishing multiple lanes (e.g., redundant paths) between a source node and a destination node in a wireless mesh network. The exemplary method and/or procedure shown in FIG. 9 can be performed by an intermediate node (e.g., user equipment, wireless device, IoT device, Bluetooth Low-Energy device, etc. or component thereof) in a wireless mesh network (e.g., a Bluetooth mesh network). For example, the exemplary method and/or procedure shown in FIG. 9 can be implemented, for example, in a node configured according to FIG. 13 (described below). Although the operations in FIG. 9 are given numerical labels, these are merely for facilitating the following explanation and, unless expressly stated to the contrary, should not be interpreted as requiring the operations in FIG. 9 to conform to any particular order.

In the exemplary embodiments illustrated by FIG. 9, hop count and number of overlaps are combined into the node count path metric such that each additional hop is weighted the same as the inclusion of a node already included in another lane. This approach has the advantage that it allows the path metric to be communicated as a single value, which maintains an existing size of control messages (e.g., RREQ and RREP messages shown in FIGS. 3-4) used for path setup while still facilitating the addition of redundancy to paths where some intermediate nodes act as single point of failures.

The intermediate node is assumed to maintain both a discovery table and a forwarding table related to routes between source-destination pairs of nodes in mesh network(s) of which the intermediate node is a part. The operations related to maintaining the discovery table, shown in the left side of FIG. 9, will be described first. In operation 910, the intermediate node receives a discovery message (e.g., RREQ) from a neighbouring node, where the message includes a source address, a destination address, and a node count field with a particular value. In operation 920, the intermediate node determines if the value of the received node count is less than the value of an entry in the discovery table associated with the source-destination pair identified by the received addresses. If the current discovery table node count value is greater than or equal to the received node count value ("no"), operation proceeds to block 930 where the node disregards the discovery message.

Otherwise (e.g., if the current discovery table node count value is less than the received node count value, or no discovery table entry exists), operation proceeds to block 940, where the node updates (or creates) the discovery table entry associated with the source-destination pair with the received node count value. Operation then proceeds to block 950, where the node determines if the forwarding table includes a path entry associated with the source-destination pair. If there is no entry present in the table ("no"), operation proceeds to block 960, where the node increments the node count value in the received discovery message by one (1). Otherwise, if there is an entry present in the table ("yes"), operation proceeds to block 970, where the node increments the node count value in the received discovery message by number of lanes +1. In either case, operation then proceeds to block 980, where the node forwards the discovery message to neighbour nodes in the mesh network.

The operations related to maintaining the forwarding table, shown on the right side of FIG. 9, are described as follows. In operation 905, the intermediate node receives a lane establishment message from a neighbouring node, where the lane establishment message includes a source address and a destination address. In operation 915, the node determines if the forwarding table includes a path entry associated with the source-destination pair. If there is no entry present in the table ("no"), operation proceeds to block 935, where the node adds an entry to the forwarding table with number of lanes=1, along with any other relevant information as described above. Otherwise ("yes"), operation proceeds to block 925 where the node increments the number of lanes value of the forwarding table entry associated with the source-destination pair. In either case, operation then proceeds to block 945, where the node forwards the lane establishment message to neighbour nodes in the mesh network.

Figure 10:
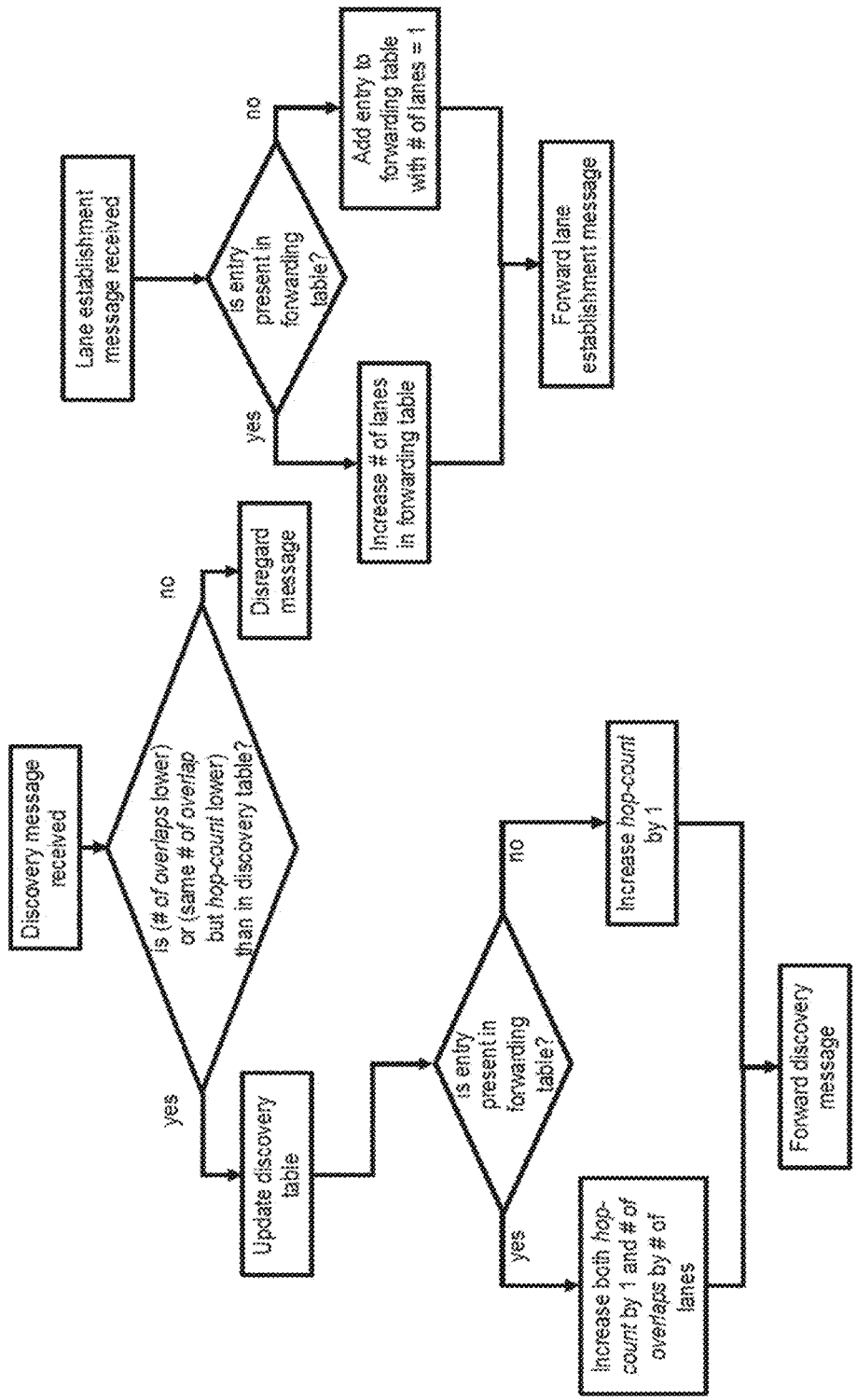

FIG. 10 shows a flow diagram of other exemplary methods and/or procedures for establishing multiple lanes (e.g., redundant paths) between a source node and a destination node in a wireless mesh network. The exemplary method and/or procedure shown in FIG. 10 can be performed by an intermediate node (e.g., user equipment, wireless device, IoT device, Bluetooth Low-Energy device, etc. or component thereof) in a wireless mesh network (e.g., a Bluetooth mesh network). For example, the exemplary method and/or procedure shown in FIG. 10 can be implemented, for example, in a node configured according to FIG. 13 (described below). Although the operations in FIG. 10 are given numerical labels, these are merely for facilitating the following explanation and, unless expressly stated to the contrary, should not be interpreted as requiring the operations in FIG. 10 to conform to any particular order.

In the exemplary embodiments illustrated by FIG. 10, hop count and number of overlaps are stored as two separate values, or fields, within the node count path metric. The nodes performing the selection of paths may then choose a path firstly based on number of overlaps and secondly based on hop count. For example, among the candidate paths, the one with the lowest hop count among those with the lowest number of overlapping nodes can be selected. This technique has the advantage and/or effect of punishing and/or discouraging paths with many overlapping nodes, since these are more vulnerable to single-node failure and/or unavailability.

Similar to the embodiments illustrated by FIG. 9, the intermediate node is assumed to maintain both a discovery table and a forwarding table related to routes between source-destination pairs of nodes in mesh network(s) of which the intermediate node is a part. The operations related to maintaining the discovery table, shown in the left side of FIG. 10, will be described first. In operation 1010, the intermediate node receives a discovery message (e.g., RREQ) from a neighbouring node, where the message includes a source address, a destination address, a node count field comprising hop count and number of overlaps subfields, each with a particular value. In operation 1020, the intermediate node determines if one of the following conditions is met:

the value of the received number of overlaps is less than the corresponding value of an entry in the discovery table associated with the source-destination pair identified by the received addresses; or the value of the received number of overlaps is equal to the corresponding value of the entry in the discovery table, but the received hop count value is lower than the corresponding value of the discovery table entry.

If neither of these conditions are met ("no"), operation proceeds to block 1030 where the node disregards the discovery message.

Otherwise (e.g., if one of the conditions are met, or no discovery table entry exists), operation proceeds to block 1040, where the node updates the discovery table entry associated with the source-destination pair with the received hop count and number of overlaps values. Operation then proceeds to block 1050, where the node determines if the forwarding table includes a path entry associated with the source-destination pair. If there is no entry present in the table ("no"), operation proceeds to block 1060, where the node increments the hop count value in the received discovery message by one (1). Otherwise, if there is an entry present in the forwarding table ("yes"), operation proceeds to block 1070, where the node increments the hop count value in the received discovery message by 1, and the number of overlaps value in the received discovery message by number of lanes. In either case, operation then proceeds to block 1080, where the node forwards the discovery message to neighbour nodes in the mesh network.

The operations related to maintaining the forwarding table, shown on the right side of FIG. 10, are described as follows. In operation 1005, the intermediate node receives a lane establishment message from a neighbouring node, where the lane establishment message includes a source address and a destination address. In operation 1015, the node determines if the forwarding table includes a path entry associated with the source-destination pair. If there is no entry present in the table ("no"), operation proceeds to block 1035, where the node adds an entry to the forwarding table with number of lanes=1. Otherwise ("yes"), operation proceeds to block 1025 where the node increments the number of lanes value of the forwarding table entry associated with the source-destination pair. In either case, operation then proceeds to block 1045, where the node forwards the lane establishment message to neighbour nodes in the mesh network.

In various embodiments, an intermediate node can also use the number of lanes value of a forwarding table entry associated with a source-destination pair, for configuring the number of network-layer retransmissions of messages that the node is forwarding along a path between that source-destination pair. For example, if the node uses N0 as a default number of retransmissions for any network-layer message, the number of retransmissions Nret for a particular network-layer message between a source-destination pair can be determined based on N0+k0*number of lanes+k1, where k0 is an integer constant greater than or equal to one, and k1 is an integer constant greater than or equal to zero. For example, k0=1 and k1=0.

Figure 11:
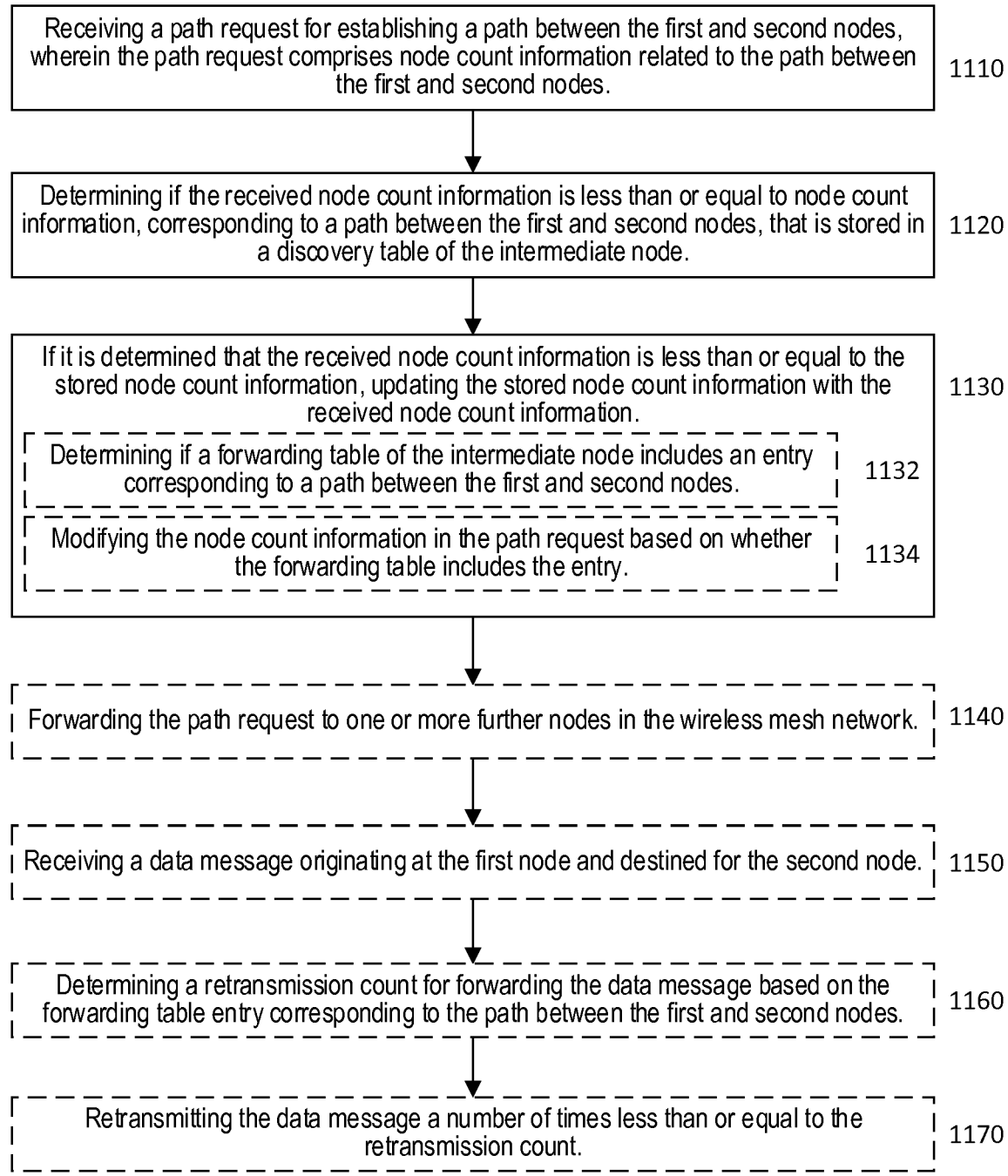
FIGS. 11-12 show flow diagrams of various exemplary methods and/or procedures for multilane path discovery between a first node and a second node in a wireless mesh network, according to various exemplary embodiments.

FIG. 11 shows a flow diagram of an exemplary method and/or procedure for multilane path discovery between a first node and a second node in a wireless mesh network. The exemplary method and/or procedure can be performed by an intermediate node (e.g., user equipment, wireless device, IoT device, Bluetooth Low-Energy device, etc. or component thereof) in the wireless mesh network (e.g., a Bluetooth mesh network). For example, the exemplary method and/or procedure shown in FIG. 11 can be implemented, for example, in a node configured according to FIG. 13 (described below). Furthermore, the exemplary method and/or procedure shown in FIG. 11 can be utilized cooperatively with the exemplary method and/or procedures shown in other figures to provide various exemplary benefits described herein. In addition, although FIG. 11 shows blocks in a particular order, this order is merely exemplary, and the operations of the exemplary method and/or procedure can be performed in a different order than shown in FIG. 11 and can be combined and/or divided into blocks having different functionality. Optional blocks or operations are shown by dashed lines.

Exemplary embodiments of the method and/or procedure illustrated in FIG. 11 can include the operations of block 1110, where the intermediate node can receive a path request for establishing a path between the first and second nodes, wherein the path request comprises node count information related to the path between the first and second nodes. For example, the path request can be an Ad hoc On-Demand Distance Vector (AODV) Route Request (RREQ) message. The exemplary method and/or procedure can also include operations of block 1120, where the intermediate node can determine if the received node count information is less than or equal to node count information, corresponding to a path between the first and second nodes, that is stored in a discovery table of the intermediate node.

The exemplary method and/or procedure can also include operations of block 1130, in which the intermediate node can perform further operations if it is determined that the received node count information is less than or equal to the stored node count information. For example, the intermediate node can update the stored node count information with the received node count information. In some embodiments, the further operations can include the operations of block 1132, where the intermediate node can determine if a forwarding table of the intermediate node includes an entry corresponding to a path between the first and second nodes. In addition, the further operations can include the operations of block 1134, where the intermediate node can modify the node count information in the path request based on whether the forwarding table includes the entry.

In some embodiments, the node count information can comprise a sum of a hop count from the first node and a number of overlapping nodes between the path and one or more further paths between the first and second nodes. In such embodiments, if it is determined that the forwarding table includes the entry corresponding to the path between the first and second nodes, the operations of block 1134 can include incrementing the node count by one plus a number of lanes between the first and second nodes via the intermediate node. In such embodiments, if it is determined that the forwarding table does not include the entry, the operations of block 1134 can include incrementing the node count information by one.

In other embodiments, the node count information can comprise a hop count from the first node and a number of overlapping nodes between the path and one or more further paths between the first and second nodes. In such embodiments, if it is determined that the forwarding table includes the entry corresponding to the path between the first and second nodes, the operations of block 1134 can include incrementing the hop count by one, and incrementing the number of overlapping nodes by a number of lanes between the first and second nodes via the intermediate node. In such embodiments, if it is determined that the forwarding table does not include the entry, the operations of block 1134 can include incrementing the hop count by one.

In some embodiments, the exemplary method and/or procedure can also include operations of block 1140, in which the intermediate node can forward the path request to one or more other nodes in the wireless mesh network. In some embodiments, the exemplary method and/or procedure can also include operations of block 1150, in which the intermediate node can receive a data message originating at the first node and destined for the second node. In such embodiments, the exemplary method and/or procedure can also include operations of block 1160, in which the intermediate node can determine a retransmission count for forwarding the data message based on the forwarding table entry corresponding to the path between the first and second nodes. In such embodiments, the exemplary method and/or procedure can also include operations of block 1170, in which the intermediate node can retransmit the data message a number of times less than or equal to the retransmission count. In some embodiments, the retransmission count can be determined based on a field, comprising the forwarding table entry, indicating a number of lanes between the first and second nodes via the intermediate node.

In some embodiments, the exemplary method and/or procedure can also include receiving a further path request for establishing a path between the first and second nodes, wherein the further path request comprises further node count information related to the path between the first and second nodes. In such embodiments, the exemplary method and/or procedure can also include, based on the node count and further node count information, selecting one of the path request and the further path request for forwarding to one or more further intermediate nodes.

In some embodiments, selecting based on the node count information and the further node count information can include: if the node count information is less than the further node count information, selecting the path request; if the node count information is greater than the further node count information, selecting the further path request; and if the node count information is equal to the further node count information, selecting one of the path request and the further path request based on at least one of the following criteria: random selection; and received signal strength indication (RSSI) associated with the path request and the further path request.

Figure 12:
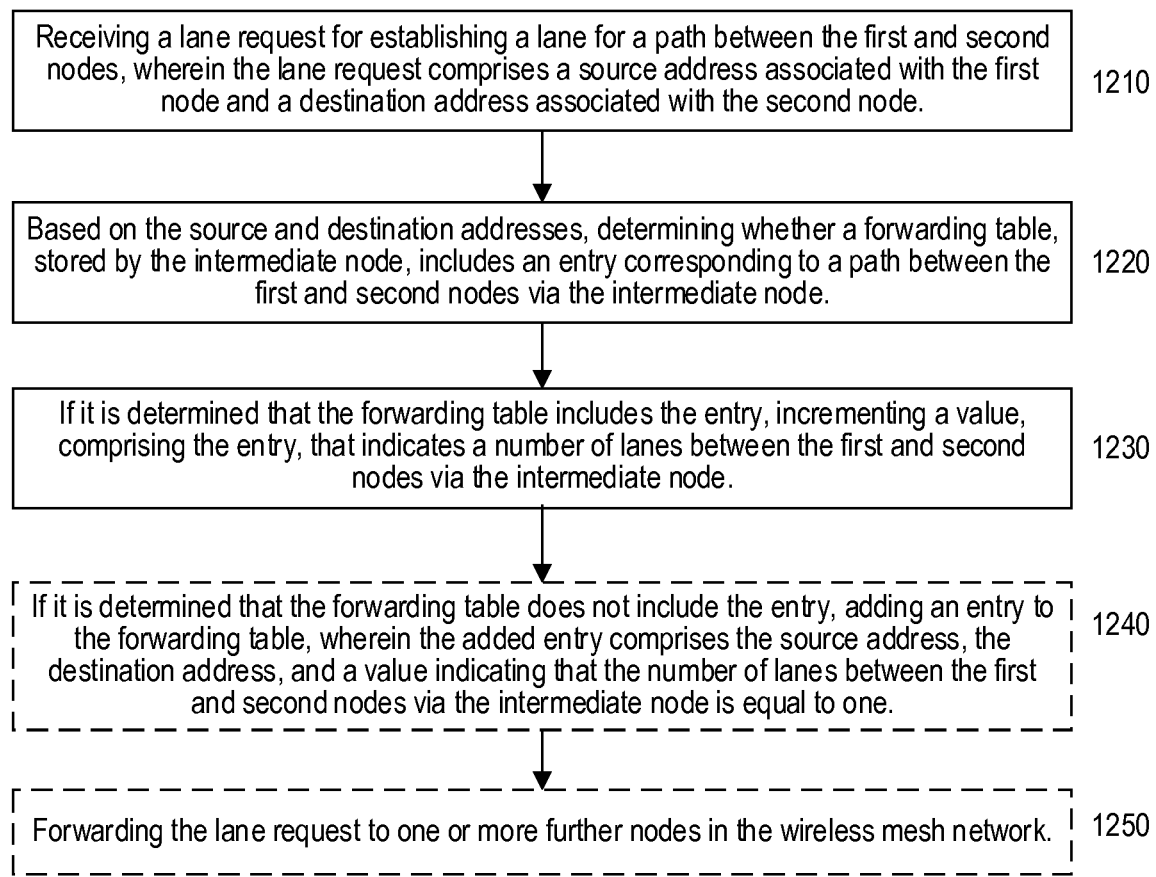

FIG. 12 shows a flow diagram of another exemplary method and/or procedure for multilane path discovery between a first node and a second node in a wireless mesh network. The exemplary method and/or procedure can be performed by an intermediate node (e.g., user equipment, wireless device, IoT device, Bluetooth Low-Energy device, etc. or component thereof) in the wireless mesh network (e.g., a Bluetooth mesh network). For example, the exemplary method and/or procedure shown in FIG. 12 can be implemented in a node configured according to FIG. 13 (described below). Furthermore, the exemplary method and/or procedure shown in FIG. 12 can be utilized cooperatively with exemplary method and/or procedures shown in other figures to provide various exemplary benefits described herein. In addition, although FIG. 12 shows blocks in a particular order, this order is merely exemplary, and the operations of the exemplary method and/or procedure can be performed in a different order than shown in FIG. 12 and can be combined and/or divided into blocks having different functionality. Optional blocks or operations are shown by dashed lines.

Exemplary embodiments of the method and/or procedure illustrated in FIG. 12 can include the operations of block 1210, in which the intermediate node can receive a lane request for establishing a lane for a path between the first and second nodes, wherein the lane request comprises a source address associated with the first node and a destination address associated with the second node. The exemplary method and/procedure can also include the operations of block 1020, in which the intermediate node can, based on the source and destination addresses, determine whether a forwarding table, stored by the intermediate node, includes an entry corresponding to a path between the first and second nodes via the intermediate node. The exemplary method and/procedure can also include the operations of block 1030, in which the intermediate node can, if it is determined that the forwarding table includes the entry, increment a value, comprising the entry, that indicates a number of lanes between the first and second nodes via the intermediate node.

In some embodiments, the exemplary method and/procedure can also include the operations of block 1040, in which the intermediate node can, if it is determined that the forwarding table does not include the entry, adding an entry to the forwarding table, wherein the added entry comprises the source address, the destination address, and a value indicating that the number of lanes between the first and second nodes via the intermediate node is equal to one. In some embodiments, the exemplary method and/procedure can also include the operations of block 1050, in which the intermediate node can forward the lane request to one or more further nodes in the wireless mesh network. In some embodiments, the lane request can comprise an Ad hoc On-Demand Distance Vector (AODV) Route Request (RREQ) message.

Figure 13:
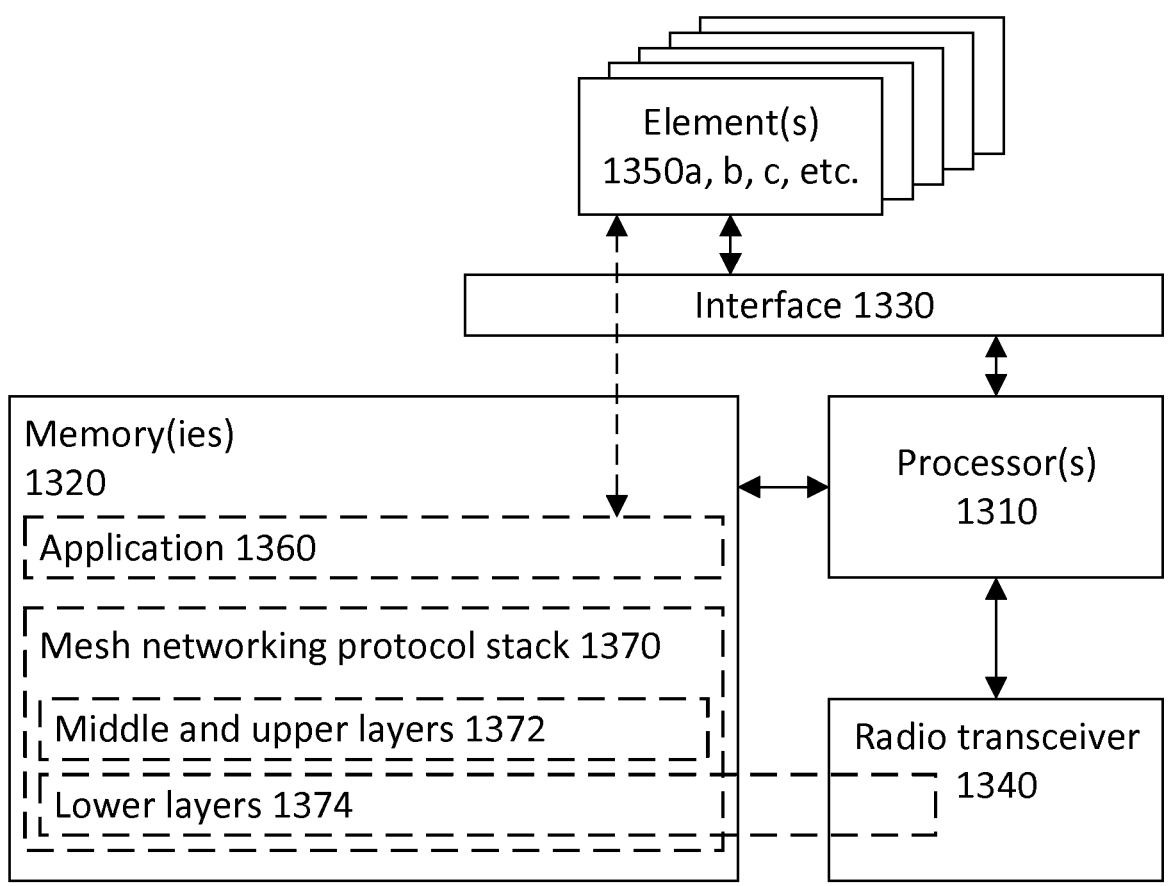
FIG. 13 shows a block diagram of an exemplary wireless mesh network device and/or node, according to various embodiments of the present disclosure

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 13 shows a block diagram of an exemplary wireless mesh network device and/or node 1300 according to various embodiments of the present disclosure. For example, exemplary node 1300 can be configured by execution of instructions, stored on a computer-readable medium, to perform operations corresponding to one or more of the exemplary methods and/or procedures described above.

Exemplary node 1300 can comprise one or more processors 1310 that can be operably connected to one or more memories 1320 via address and data buses, serial ports, or other methods and/or structures known to those of ordinary skill in the art. Memory(ies) 1320 comprises software code or programs executed by processor(s) 1310 that facilitates, causes and/or programs exemplary node 1300 to perform various operations.

Figure 2:
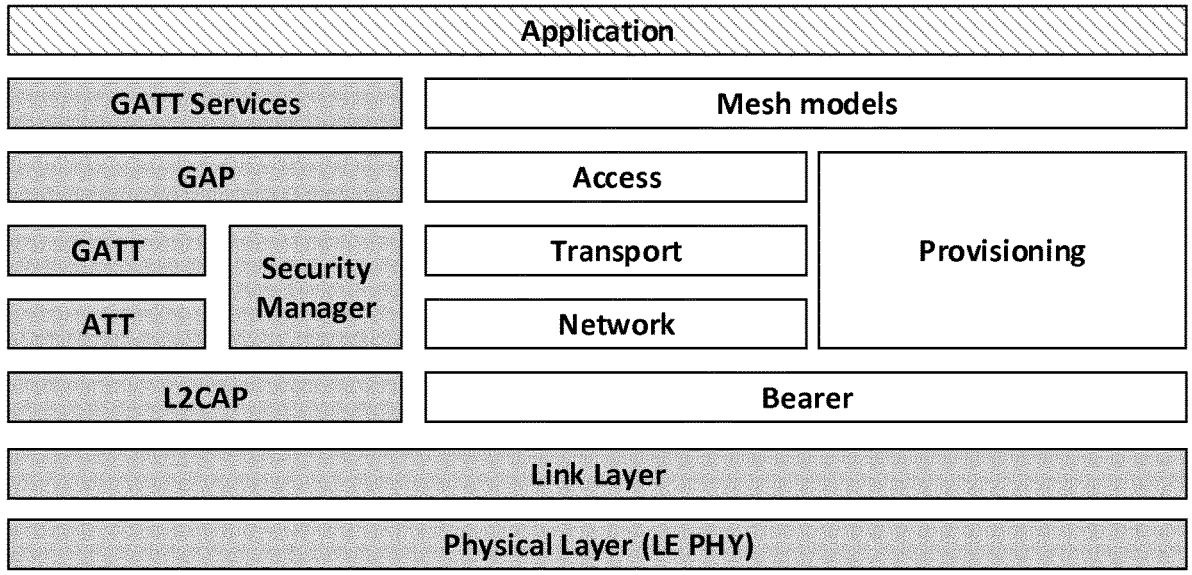
FIG. 2 illustrates an exemplary integration of Bluetooth mesh networking with the Bluetooth LE architecture shown in FIG. 1.

As shown in FIG. 13, memory(ies) 1320 can include an application 1360 (e.g., application code) and a mesh networking protocol stack 1370, which can further comprise middle and upper layers 1372 and lower layers 1374. For example, protocol stack 1370 can comprise a Bluetooth mesh networking protocol stack, such as shown in FIGS. 1 and 2 and described in more detail above. In such case, the lower layers 1374 can include the Bluetooth LE PHY and link layers, with the remainder of the Bluetooth mesh networking protocol stack comprising middle and upper layers 1372. Furthermore, protocol stack 1370 can include software code that, when executed by processor(s) 1310, configures node 1300 to perform any of the exemplary methods and/or procedures described above, including those shown in FIG. 9-12.

In some embodiments, memory(ies) 1320 and processor(s) 1310 can be subdivided into multiple processors and memories such that a particular memory stores code for lower layers 1374 that is executed by a particular processor, and a further memory stores code for middle and upper layers 1372 that is executed by a further processor. For example, in Bluetooth mesh networking embodiments, the particular memory and particular processor can operate as a Bluetooth device or controller while the further memory and further processor can operate as a Bluetooth host, with a host-controller interface (HCI) between the two.

Exemplary node 1300 also includes a radio transceiver 1340 that is coupled to and communicates with processor 1310. Radio transceiver 1340 includes a transmitter and receiver operable (e.g., in conjunction with processor 1310) to transmit and receive wireless signals at a particular frequency or band of frequencies. In Bluetooth mesh networking embodiments, radio transceiver 1340 can be configured to transmit and receive according to the Bluetooth LE standard in the 2.4-GHz ISM band. In some embodiments, radio transceiver 1340 can comprise portions of lower layers 1374, as illustrated in FIG. 13. For example, in Bluetooth mesh network embodiments, the Bluetooth LE physical layer can be implemented by radio transceiver 1340 in combination with software code executed by processor 1310. Furthermore, although not shown, radio transceiver 1340 can include one or more antennas that facilitate transmission and reception in the appropriate frequency band.

In some embodiments, node 1300 can also include one or more element(s) 1350*a*, 1350*b*, 1350*c*, etc. that can provide an interface with the physical environment in which node 1300 is located. For example, element(s) 1350 can monitor and/or collect data related to operation of a physical process or machine. As another example, element(s) 1350 can control one or more aspects of such a physical process. As such, it can be desirable to transmit the collected data to and/or receive control commands from a remote source via the mesh networking functionality of node 1300.

This can be done, for example, by application 1360 which can communicate with both mesh networking stack 1370 and the element(s) 1350. This logical communication between application 1360 and element(s) 1350 is illustrated in FIG. 13 as a dashed line. In some embodiments, however, the physical communication (illustrated by solid lines) between application 1360 and element(s) 1350 can be performed via an interface circuit 1330 interposed between element(s) 1350 and processor(s) 1310.

As described herein, device, node, and/or apparatus can be represented by a semiconductor chip, a chipset, or a (hardware) module comprising such chip or chipset; this, however, does not exclude the possibility that a functionality of a device, node, or apparatus, instead of being hardware implemented, be implemented as a software module such as a computer program or a computer program product comprising executable software code portions for execution or being run on a processor. Furthermore, functionality of a device, node, or apparatus can be implemented by any combination of hardware and software. A device, node, or apparatus can also be regarded as an assembly of multiple devices and/or apparatuses, whether functionally in cooperation with or independently of each other. Moreover, devices, nodes, and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated embodiments:

EXEMPLARY EMBODIMENTS

1. A method for multilane path discovery between a first node and a second node in a wireless mesh network, the method being performed by an intermediate node and comprising:
receiving a path request for establishing a path between the first and second nodes, wherein the path request comprises node count information related to the path between the first and second nodes;
determining if the received node count information is less than or equal to node count information, corresponding to a path between the first and second nodes, that is stored in a discovery table of the intermediate node; and
if it is determined that the received node count information is less than or equal to the stored node count information, updating the stored node count information with the received node count information.

In other words, the method may be described as a method for supporting establishment of a path between a source node, being the first node, and a destination node, being the second node, in a wireless mesh network, said path comprising one or more intermediate nodes, wherein each intermediate node in said network is arranged to maintain a forwarding table identifying paths in said wireless mesh network and a discovery table arranged to maintain a path metric indicating a predefined metric of said paths, said method comprising the steps of:

receiving, by said intermediate node, a path discovery message, said path discovery message comprising a path metric;

determining, by said intermediate node, that said path metric is lower than path metric already stored and available in said discovery table at said intermediate node;

updating, by said intermediate node, said path metric in said discovery table with said received path metric value;

updating, by said intermediate node, said path metric value, to obtain an updated path metric value upon completion of said step of determining;

forwarding, by said intermediate node, said path discovery message with said updated path metric, thereby supporting establishment of said path between said source node and said destination node in said wireless mesh network.

2. The method of embodiment 1, further comprising, if it is determined that the received node count information is less than or equal to the stored node count information:

determining if a forwarding table of the intermediate node includes an entry corresponding to a path between the first and second nodes; and modifying the node count information in the path request based on whether the forwarding table includes the entry.

3. The method of embodiment 2, wherein:

the node count information comprises a sum of a hop count from the first node and a number of overlapping nodes between the path and one or more further paths between the first and second nodes; and if it is determined that the forwarding table includes the entry corresponding to the path between the first and second nodes, modifying the node count information comprises incrementing the node count by one plus a number of lanes between the first and second nodes via the intermediate node.

4. The method of embodiment 3, further comprising, if it is determined that the forwarding table does not include the entry, modifying the node count information comprises incrementing the node count information by one.

5. The method of embodiment 2, wherein:

the node count information comprises a hop count from the first node and a number of overlapping nodes between the path and one or more further paths between the first and second nodes; and if it is determined that the forwarding table includes the entry corresponding to the path between the first and second nodes, modifying the node count information comprises:

incrementing the hop count by one; and incrementing the number of overlapping nodes by a number of lanes between the first and second nodes via the intermediate node.

6. The method of embodiment 5, further comprising, if it is determined that the forwarding table does not include the entry, modifying the node count information comprises incrementing the hop count by one.

7. The method of any of embodiments 1-6, further comprising forwarding the path request to one or more other nodes in the wireless mesh network.

8. The method of any of embodiments 1-7, further comprising: receiving a further path request for establishing a path between the first and second nodes, wherein the further path request comprises further node count information related to the path between the first and second nodes;

based on the node count and further node count information, selecting one of the path request and the further path request for forwarding to one or more further intermediate nodes.

9. The method of embodiment 8, wherein selecting based on the node count information and the further node count information comprises:

if the node count information is less than the further node count information, selecting the path request;

if the node count information is greater than the further node count information, selecting the further path request; and if the node count information is equal to the further node count information, selecting one of the path request and the further path request based on at least one of the following criteria:

random selection; and received signal strength indication (RSSI) associated with the path request and the further path request.

10. The method of any of embodiment 2-9, further comprising:

receiving a data message originating at the first node and destined for the second node;

determining a retransmission count for forwarding the data message based on the forwarding table entry corresponding to the path between the first and second nodes; and retransmitting the data message a number of times less than or equal to the retransmission count.

11. The method of embodiment 10, wherein the retransmission count is determined based on a field, comprising the forwarding table entry, indicating a number of lanes between the first and second nodes via the intermediate node.

12. The method of any of embodiments 1-11, wherein the path request comprises an Ad hoc On-Demand Distance Vector (AODV) Route Request (RREQ) message.

13. The method of any of embodiments 1-12, wherein the wireless mesh network is a Bluetooth mesh network, and the method is performed by a Bluetooth Low-Energy node.

14. A method for multilane path discovery between a first node and a second node in a wireless mesh network, the method being performed by an intermediate node and comprising:

receiving a lane request for establishing a lane for a path between the first and second nodes, wherein the lane request comprises a source address associated with the first node and a destination address associated with the second node;

based on the source and destination addresses, determining whether a forwarding table, stored by the intermediate node, includes an entry corresponding to a path between the first and second nodes via the intermediate node;

if it is determined that the forwarding table includes the entry, incrementing a value, comprising the entry, that indicates a number of lanes between the first and second nodes via the intermediate node.

15. The method of embodiment 14, further comprising, if it is determined that the forwarding table does not include the entry, adding an entry to the forwarding table, wherein the added entry comprises the source address, the destination address, and a value indicating that the number of lanes between the first and second nodes via the intermediate node is equal to one.

16. The method of any of embodiments 14-15, further comprising forwarding the lane request to one or more further nodes in the wireless mesh network.

17. The method of any of embodiments 14-16, wherein the lane request comprises an Ad hoc On-Demand Distance Vector (AODV) Route Request (RREQ) message.

18. The method of any of embodiments 14-17, wherein the wireless mesh network is a Bluetooth mesh network, and the method is performed by a Bluetooth Low-Energy node.

19. A method for discovery of multiple lanes of a path through a wireless mesh network, wherein a path metric comprising a hop count and information on the number of overlapping nodes is used in the path selection.

20. The method of embodiment 19, wherein the path metric is incremented by 1 at each hop through the wireless mesh network and also incremented by 1 at each node that belongs to an existing lane in the path.

21. The method of any of embodiments 19-20, wherein a path metric is compared by selecting the path with the minimum number of nodes first, and then for the same number of overlapping nodes, the path with the minimum number of hops.

22. A method according to any of embodiments 19-21, further comprising comparing multiple paths and select the best path based on said path metrics.

23. A method for selecting a number of retransmissions of data messages, by an intermediate node in a wireless network, based on stored value, in the node's forwarding table, indicating a number of lanes between a source node and a destination node via the intermediate node.

24. A node in a wireless mesh network that includes one or more source nodes, one or more destination nodes, and a plurality of intermediate nodes, wherein the node comprises:
a wireless transceiver; and
processing circuitry operatively coupled to the wireless transceiver, the combination being configured to perform operations corresponding to the methods of any of embodiments 1-23.

25. A non-transitory, computer-readable medium storing computer-executable instructions that, when executed by processing circuitry comprising a node in a wireless mesh network, configure the node to perform operations corresponding to the methods of any of embodiments 1-23.

26. A wireless mesh network comprising:
one or more source nodes, each source node comprising a wireless transceiver and processing circuitry operably coupled and configured to generate path requests and lane requests;
one or more destination nodes, each destination node comprising a wireless transceiver and processing circuitry operably coupled and configured to generate path replies and lane replies; and
a plurality of intermediate nodes interconnected in a mesh topology and configured to forward messages between the source nodes and the destination nodes, and further configured to perform operations corresponding to the methods of any of embodiments 1-23.

Notably, modifications and other embodiments of the disclosed embodiments will come to mind to one skilled in the art having the benefit of the teachings presented in the foregoing descriptions and the associated drawings. Therefore, it is to be understood that the scope of the disclosure is not to be limited to the specific embodiments disclosed and that modifications and other variants are intended to be included within the scope. Although specific terms can be employed herein, they are used in a generic and descriptive sense only and not for purposes of limitation.

The invention claimed is:

1. A method for multilane path discovery between a first node and a second node in a wireless mesh network, the method being performed by an intermediate node and comprising:
receiving a path request for establishing a path between the first and second nodes, wherein the path request comprises received node count information related to the path between the first and second nodes;
determining that the received node count information is less than or equal to stored node count information, associated with the first and second nodes, that is stored in a discovery table of the intermediate node; and
updating the stored node count information with the received node count information, wherein the stored node count information and the received node count information are based on: a hop count from the first node, and a number of overlapping nodes between the path and one or more further paths between the first and second nodes.

2. The method of claim 1, further comprising:
determining that a forwarding table of the intermediate node includes an entry corresponding to a path between the first and second nodes; and
modifying the received node count information in the path request based on the forwarding table.

3. The method of claim 2, wherein:
the received node count information comprises a sum of the hop count from the first node and the number of overlapping nodes; and
modifying the received node count information comprises incrementing the received node count by one plus a number of lanes between the first and second nodes via the intermediate node.

4. The method of claim 2, wherein:
the received node count information comprises the hop count from the first node and the number of overlapping nodes, as separate values or fields;
modifying the received node count information comprises incrementing the hop count by one; and
the method further comprises incrementing the number of overlapping nodes by a number of lanes between the first and second nodes via the intermediate node.

5. The method of claim 2, further comprising:
receiving a data message originating at the first node and destined for the second node;
determining a retransmission count for forwarding the data message based on the forwarding table entry corresponding to the path between the first and second nodes; and
retransmitting the data message a number of times less than or equal to the retransmission count.

6. The method of claim 5, wherein the retransmission count is determined based on a field of the forwarding table entry that indicates a number of lanes between the first and second nodes via the intermediate node.

7. The method of claim 1, further comprising forwarding the path request to one or more other nodes in the wireless mesh network.

8. The method of claim 1, further comprising:
receiving a further path request for establishing a path between the first and second nodes, wherein the further path request comprises further node count information related to the path between the first and second nodes, and wherein the further node count information is based on the hop count from the first node and the number of overlapping nodes between the path and one or more further paths between the first and second nodes; and based on the received node count information and the further node count information, selecting one of the path request and the further path request for forwarding to one or more further intermediate nodes.

9. The method of claim 8, wherein selecting based on the received node count information and the further node count information comprises:
   selecting the path request upon determining that the received node count information is less than the further node count information;
   selecting the further path request upon determining that the received node count information is greater than the further node count information; and
   selecting any one of the path request and the further path request upon determining that the received node count information is equal to the further node count information, said selection being based on at least one of the following criteria:
      random selection; and
      received signal strength indication (RSSI) associated with the path request and the further path request.

10. The method of claim 1, wherein the path request comprises an Ad hoc On-Demand Distance Vector (AODV) Route Request (RREQ) message.

11. The method of claim 1, wherein the wireless mesh network is a Bluetooth mesh network, and the intermediate node is a Bluetooth Low-Energy node.

12. An intermediate node in a wireless mesh network that includes one or more source nodes, one or more destination nodes, and a plurality of intermediate nodes, wherein the intermediate node comprises:
   a wireless transceiver; and
   processing circuitry operatively coupled to the wireless transceiver, wherein the processing circuitry and the wireless transceiver are configured to perform operations corresponding to the method of claim 1.

13. A wireless mesh network comprising:
   one or more source nodes, each source node comprising a wireless transceiver and processing circuitry operably coupled and configured to generate path requests and lane requests;
   one or more destination nodes, each destination node comprising a wireless transceiver and processing circuitry operably coupled and configured to generate path replies and lane replies; and
   a plurality of intermediate nodes interconnected in a mesh topology, each intermediate node comprising a wireless transceiver and processing circuitry operably coupled and configured to forward messages between the source nodes and the destination nodes, and further configured to perform operations corresponding to the method of claim 1.

14. The wireless mesh network of claim 13, wherein the wireless transceiver and the processing circuitry of each intermediate node are further configured to:
   receive a lane request for establishing a lane for a path between the first and second nodes, wherein the lane request comprises a source address associated with the first node and a destination address associated with the second node;
   determine that a forwarding table, stored by the intermediate node, includes an entry corresponding to a path between the first and second nodes via the intermediate node, based on the received source and destination addresses;
   increment a value, comprising the entry, that indicates a number of lanes between the first and second nodes via the intermediate node.

* * * * *

UNITED STATES PATENT AND TRADEMARK OFFICE
CERTIFICATE OF CORRECTION

PATENT NO. : 12,213,050 B2
APPLICATION NO. : 17/294970
DATED : January 28, 2025
INVENTOR(S) : Di Marco et al.

It is certified that error appears in the above-identified patent and that said Letters Patent is hereby corrected as shown below:

In the Drawings

In Fig. 9, Sheet 6 of 10, delete "Figure" and insert -- Fig. --, therefor.

In Fig. 10, Sheet 7 of 10, delete "Figure" and insert -- Fig. --, therefor.

In the Specification

In Column 4, Line 54, delete "node" and insert -- node. --, therefor.

In Column 5, Line 18, delete "and/procedures" and insert -- and/or procedures --, therefor.

In Column 5, Lines 23-24, delete "and/procedures" and insert -- and/or procedures --, therefor.

In Column 5, Line 30, delete "and/procedures" and insert -- and/or procedures --, therefor.

In Column 6, Line 3, delete "FIG. 7-8 illustrates" and insert -- FIGS. 7-8 illustrate --, therefor.

In Column 6, Line 16, delete "disclosure" and insert -- disclosure. --, therefor.

In Column 7, Lines 9-10, delete "request session. number." and insert -- request. --, therefor.

In Column 7, Line 54, delete "in term" and insert -- in terms --, therefor.

In Column 13, Line 57, delete "indication" and insert -- indicator --, therefor.

In Column 14, Line 21, delete "and/procedure" and insert -- and/or procedure --, therefor.

In Column 14, Line 22, delete "block 1020," and insert -- block 1220, --, therefor.

Signed and Sealed this
Fourteenth Day of October, 2025

John A. Squires
*Director of the United States Patent and Trademark Office*

CERTIFICATE OF CORRECTION (continued)
U.S. Pat. No. 12,213,050 B2

In Column 14, Line 27, delete "and/procedure" and insert -- and/or procedure --, therefor.

In Column 14, Line 27, delete "block 1030," and insert -- block 1230, --, therefor.

In Column 14, Lines 33-34, delete "and/procedure" and insert -- and/or procedure --, therefor.

In Column 14, Line 34, delete "block 1040," and insert -- block 1240, --, therefor.

In Column 14, Line 41, delete "and/procedure" and insert -- and/or procedure --, therefor.

In Column 14, Line 42, delete "block 1050," and insert -- block 1250, --, therefor.

In Column 15, Line 18, delete "FIG. 9-12." and insert -- FIGS. 9-12. --, therefor.

In Column 15, Line 29, delete "(HCl)" and insert -- (HCI) --, therefor.

In Column 15, Line 58, delete "mesh networking stack" and insert -- mesh networking protocol stack --, therefor.

In Column 18, Line 21, delete "indication" and insert -- indicator --, therefor.

In Column 18, Line 23, delete "embodiment" and insert -- embodiments --, therefor.

In the Claims

In Column 21, Line 23, in Claim 9, delete "indication" and insert -- indicator --, therefor.